United States Patent
Belter

(10) Patent No.: US 6,435,517 B1
(45) Date of Patent: Aug. 20, 2002

(54) GASKET TAB RETAINER

(75) Inventor: Jerome G. Belter, Mt. Prospect, IL (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/827,797

(22) Filed: Apr. 6, 2001

Related U.S. Application Data

(63) Continuation-in-part of application No. 09/218,490, filed on Dec. 22, 1998.
(60) Provisional application No. 60/212,453, filed on Jun. 19, 2000.

(51) Int. Cl.$^7$ ................................................. F02F 11/00
(52) U.S. Cl. ....................... 277/591; 277/591; 277/598; 277/609
(58) Field of Search ................................ 277/591, 598, 277/609

(56) References Cited

U.S. PATENT DOCUMENTS

| | | | |
|---|---|---|---|
| 3,063,439 A | 11/1962 | Kessel | 123/195 |
| 3,654,382 A | 4/1972 | Rubright | 174/153 G |
| 4,088,347 A | 5/1978 | Bruggermann et al. | 285/24 |
| 4,524,979 A | 6/1985 | Bauder | 277/189 |
| 5,105,777 A | 4/1992 | Kronich et al. | 123/193.3 |
| 5,333,884 A | 8/1994 | Miyaoh et al. | 277/235 B |
| 5,343,837 A | 9/1994 | Ward et al. | 123/193.5 |
| 5,603,515 A | 2/1997 | Bock | 277/235 B |
| 5,636,515 A | 6/1997 | Matsumoto et al. | 60/323 |
| 5,716,051 A | 2/1998 | Cornea et al. | 277/9.5 |
| 5,947,483 A | 9/1999 | Brümmer et al. | 277/592 |
| 6,318,731 B1 * | 11/2001 | Belter | 277/591 |

* cited by examiner

*Primary Examiner*—Anthony Knight
*Assistant Examiner*—E Peavey
(74) *Attorney, Agent, or Firm*—Rader, Fishman & Grauer PLLC

(57) ABSTRACT

A gasket for sealing between a flange and a mating surface includes a metal layer having at least two integral tabs formed as a continuation of said metal layer. The flange includes at least two apertures that are correspondingly sized and positioned to receive the tabs. In a first embodiment, each tab is formed on the outer periphery of the metal layer and comprises two contoured, resilient legs separated to form a vertical slot between the legs, and a contoured tip located at a distal end of each tab leg. In a second embodiment, each tab includes a serrated resilient edge that promotes tab insertion, but digs into an inner periphery of the aperture upon attempted tab removal. In a third embodiment, each tab is formed on an inner periphery of two mounting apertures formed in the metal layer.

17 Claims, 3 Drawing Sheets

GASKET TAB RETAINER

RELATED APPLICATIONS

The present application claims the benefit of U.S. Provisional Application No. 60/212,453, filed Jun. 19, 2000, which is a continuation-in-part of U.S. application Ser. No. 09/218,490, filed Dec. 22, 1998, the disclosures of which are incorporated by reference herein in their entirety.

FIELD OF THE INVENTION

The present invention relates to a gasket tab retainer. More particularly, the present invention relates to a multiple layer steel laminate gasket including at least two integral tabs formed in a metal layer of the gasket to locate and retain the gasket on a mating flange.

BACKGROUND OF THE INVENTION

Gaskets are often used as seal between mating metal surfaces. One common application involves the placement of a gasket between a head and an exhaust manifold of an internal combustion engine. Another application involves gasket placement between the exhaust manifold and an exhaust pipe flange. Gaskets for either application can be considered high temperature gaskets and more particularly exhaust manifold gaskets since they provide an exhaust seal which prevents the byproducts of combustion exiting the engine from escaping into the engine compartment of a vehicle.

Exhaust manifold gaskets are typically installed by placing the gasket between an exhaust manifold and its mating component and aligning bolt holes or apertures formed in the gasket with corresponding holes formed in the manifold and mating component. Typically, a threaded fastener passes through the manifold and gasket and engages a corresponding threaded aperture formed in the mating component. Some maneuvering of the manifold and gasket relative to the mating component may be required to align the holes therein with the corresponding threaded apertures of the mating component before the fasteners can be inserted. However, during the assembly process, the gasket may slip from its desired position or drop off the end of the inserted fastener before it can be fixed in place between the exhaust manifold and its mating component.

Attempts have been made to retain a gasket against a mating component prior to and during assembly by providing separate clips for attaching the gasket to a gasket attaching portion of an engine part. Using such clips, a gasket is placed adjacent the mating component, and the separate clip is attached to the mating component such that the gasket is secured in place between the clip and the mating component. The separate clips typically include one end for contacting the gasket about an outer periphery thereof while a second end is attached to an outer periphery of a mating component or to an outer periphery of a connecting portion between mating components. Use of such separate clips does not eliminate the problems involved in the assembly process whereby a gasket may slip from its desired position. The clip attached to an outer periphery of the mating component may be jostled or become otherwise dislodged by contacting adjacent parts. Further, separate clips may become dislodged during sub-assembly handling and shipping of mating components, allowing the gasket to slip or drop. As a result, the gasket sealing portion may become offset or misaligned from the holes to be sealed before assembly, again requiring some maneuvering of the manifold and gasket relative to the mating component during assembly in order to achieve a tight seal. Assembly of a gasket to a mating flange using separate clips is also a complex operation, requiring multiple parts and means to hold the gasket adjacent the mating flange while the clips are attached. Finally, because such clips are designed to interact with an outer periphery of a gasket, the gasket itself must cover the full radial extent of a mating surface.

SUMMARY OF THE INVENTION

An exhaust manifold gasket for sealing between an exhaust header and a mating flange is provided that includes integral tabs formed on an outer periphery of the gasket to locate and retain the gasket on the mating flange. In accordance with the present invention, at least two tabs are integrally formed on an outer periphery of a metal layer of a multiple layer steel laminate gasket for attaching the gasket to a first mating flange. After the gasket is attached, the first mating flange to which the gasket is attached by the tabs is easily fixed to a second mating flange without supporting the gasket between the flanges.

The gasket of the present invention includes a metal layer having a length and a width, wherein the length is greater than the width. The metal layer constitutes at least a part of the gasket, and includes at least one hole formed therein corresponding to an exhaust gas flow hole in the first mating flange. A first outer periphery is defined by a radially outer edge of the first mating flange, while the gasket length and width defines a second outer periphery. The second outer periphery fits entirely within the first outer periphery. At least two tabs are integrally formed along the width of the layer, and are bent generally perpendicular relative to the rest of the gasket. The two tabs prevent the gasket from rotating relative to the mating flange after the gasket has been installed. The first mating flange further includes at least two apertures located within the first outer periphery that are sized and positioned to receive the tabs.

In one preferred embodiment, each tab comprises two contoured, resilient legs separated to form a vertical slot between the legs. Each tab leg further includes a contoured tip located at a distal end of each tab leg. The contoured tip includes a sloped portion that slopes laterally outwardly from the distal end of each tab leg along an outside edge of each tab leg. The sloped portion terminates in a laterally outwardly extending protrusion that creates an interference fit when inserted into the aperture. The vertical slot between the legs allows each leg to deform to adjust for aperture size tolerance.

Because the apertures are formed inside the configuration of the mating component, i.e. within the first outer periphery, a gasket formed according to the present invention uses less material, thereby reducing cost. The resilient tab legs deform when inserted into the corresponding apertures, such that insertion of the legs into corresponding apertures positively locates the gasket in place against the mating flange. Thus, the configuration of the resilient legs produces a tight interference fit within the apertures. The gasket is therefore held tightly in place by the tab legs. The tab legs are also positioned vertical to the width of the gasket, allowing for adjustment of the gasket relative to the mating flange to account for linear tolerances of the apertures and for gasket tolerances. Finally, the tabs are integral to a metal layer that comprises at least a portion of a gasket, so that manufacture is easily accomplished. Moreover, no separate clips are needed to positively locate the gasket adjacent a mating flange.

In a second preferred embodiment, each tab comprises a serrated side edge. The edge is oriented such that the tab may be easily inserted into a mating aperture. However, the edge digs into the inner periphery of the mating aperture upon attempted removal of the tab.

In accordance with a third embodiment, a two layer laminate gasket is disclosed having at least two mounting apertures. The gasket includes at least two tabs; each tab being integrally formed on an inner periphery of an aperture. The geometry and function of the tabs are substantially similar to those disclosed in the first two embodiments.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
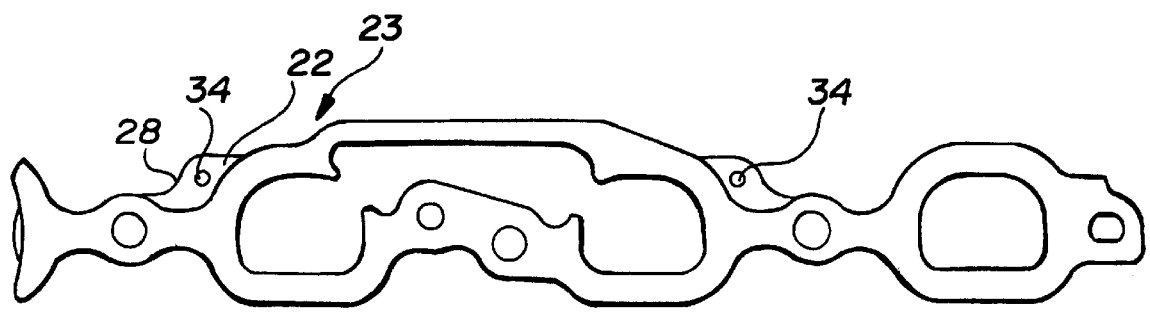
FIG. 1 is a top view showing a component such as an engine manifold with a flange according to the present invention.
Figure 2:
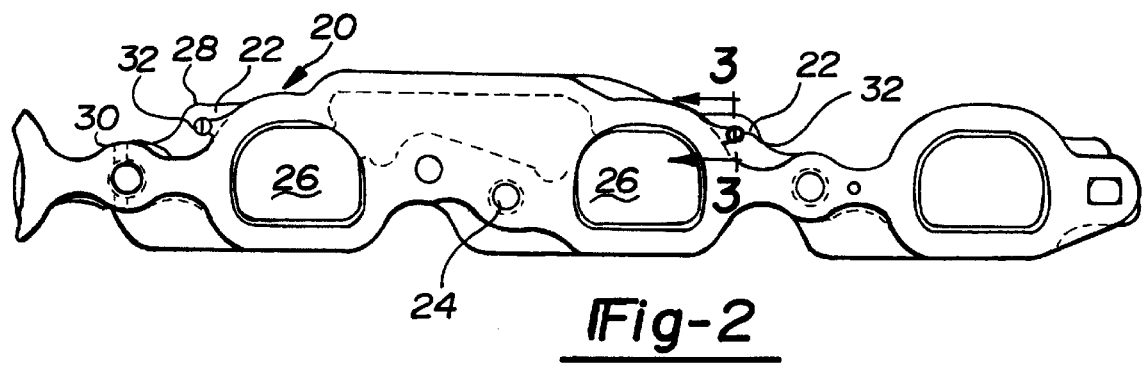
FIG. 2 is a top view showing a gasket according to the present invention placed adjacent the mating flange of the component illustrated in FIG. 1.

In FIG. 2, a gasket 20 is shown installed adjacent a first mating flange 22 on an exhaust manifold 23, the manifold being illustrated in FIG. 1. The gasket 20 includes a plurality of bolt holes 24 and exhaust gas flow holes 26 that correspond to similar holes in the first mating flange 22. The mating flange 22 defines a first outer periphery 28, and the gasket 20 defines a second outer periphery 30. As can be seen in FIG. 2, the first outer periphery 28 fully encloses the second outer periphery 30. As a result, the gasket 20 covers less than the fall extent of the mating flange 22. Because of the arrangement of the flow holes 26, the length L of the gasket 20 is greater than the width W of the gasket.

Because seals on the exhaust manifold must withstand high temperatures, the gasket 20 is typically formed from metal, and usually includes multiple metal layers. Typically, the metal layers are made from resilient steel, and all layers of the gasket 20 are sized and shaped to fit and seal a corresponding mating surface. The outermost (i.e. top and bottom) layers (not shown) of the gasket 20 may further include embossments, folds or any other surface feature designed to improve fit, wear and sealing ability of the gasket.

According to the present invention, at least one layer of the gasket 20 includes at least two integral tabs 32 formed along the second outer periphery 30. The two tabs 32 are spaced from each other to prevent rotation of the gasket relative to the first mating flange 22 once the gasket 20 is installed. The first mating flange 22 includes at least two apertures 34 located within the first outer periphery that are sized and positioned to receive the tabs 32. Preferably, the tabs 32 are formed along the outer periphery of the gasket 20 parallel to the width W of the gasket 20, thereby allowing the tabs 32 to flex within the apertures 34 and account for linear tolerances of the apertures and for gasket tolerances. Moreover, because the apertures 34 are located within the first outer periphery of the first mating flange 22, the gasket itself does not cover the entire surface of the first mating flange 22. Instead, the gasket 20 is smaller than the first mating flange 22, thereby requiring less material for fabrication.

Prior to assembly of the gasket 20 against the first mating flange 22, the tabs 32 are bent generally perpendicular relative to the gasket 20. The gasket 20 is then placed adjacent the first mating flange 22 so that the tabs 32 align with and are inserted into the apertures 34. The tabs 32 are sized to frictionally engage the inner surface 36 of the apertures 34 and to thereby retain the gasket 20 in place against the first mating flange 22. Thus, an outermost periphery of tabs 32 in an uncompressed state is greater in dimension than a corresponding inner surface of the apertures 34.

Figure 3:
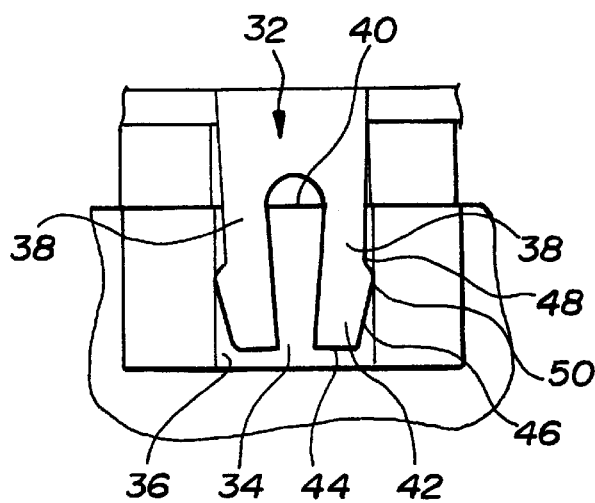
FIG. 3 is a side view of a tab retainer as it is inserted into an aperture according to lines 3—3 of FIG. 2.

The tabs 32 may be formed into any geometric shape that is convenient to manufacture and that achieves a tight interference fit within appropriately sized apertures 34. Most preferably, as seen in FIG. 3, the tabs 32 are formed from two contoured legs 38 that are separated to form a slot 40 between the tab legs 38. Each tab leg 38 further includes a contoured tip 42 located at a distal end 44 of each tab leg 38.

The contoured tip 42 of each tab leg is preferably formed into a sloped portion 46 that slopes laterally outwardly from the distal end 44 along an outside edge 48 of each tab leg 38. Each sloped portion 46 terminates in a contoured, laterally outwardly extending protrusion 50. Thus, a protrusion 50 is located at either side of the tab 32. As the tab 32 is inserted into the aperture 34, a portion the sloped portion 46 contacts the inner surface 36 of the aperture 34, forcing the tab leg 38 to gradually compress laterally inwardly as it is inserted. Thus, the sloped portion 46 aids in pre-loading the tab legs 38 while making insertion into aperture 34 easier. The protrusion 50 is sized to create an interference fit when placed in contact with the inner surface 36 of the aperture 34, but is small enough to be easily inserted within the aperture 34.

As noted above, the tab legs 38 are separated to form a slot 40 between the tab legs. Formation of the slot 40 allows the slight inward deformation of each resilient tab leg 38 as it is inserted into the aperture 34. The slot 40 also allows each tab leg 38 to deform independently of the other tab leg, so that the tab legs 38 in combination are able to self adjust to the actual diameter of the aperture 34. The size of the slot 40 also allows the tab legs 38 to adjust for minor variations in the location of the apertures, thus providing a suitable tolerance.

In assembling a gasket 20 to a first mating flange 22, the tabs 32 are bent generally perpendicular relative to the gasket 20, so that the tabs 32 are positioned generally vertical to the width of the gasket. As applied to the preferred embodiment, the tab legs 38 are thus positioned vertical to the width of the gasket. The gasket 20 is then placed adjacent the first mating flange 22 so that the tabs 32, including the tab legs 38, align with and are inserted into the apertures 34. As the tabs 32 are inserted into the apertures 34, the sloped portion 46 first contacts the inner surface 36 of aperture 34. As the tabs 32 are further inserted into the aperture 34, the tab legs 38 are independently forced to deform slightly inwardly. When the tab legs 38 have been fully inserted into the aperture 34, only the protrusions 50 contact the inner surface 36 of the aperture 34. The resilient tabs maintain a slightly laterally inwardly deformed position, thereby applying a force laterally outwardly against the inner surface 36 of the aperture 34. The outward force applied through the protrusions 46 is sufficient to cause a tight interference fit of the tabs 32 within the aperture 34 such that the entire gasket 20 is maintained in position adjacent the first mating flange 22. The first mating flange 22 may then await assembly or shipment to a location for assembly at a later time without the gasket 20 becoming dislodged from it.

Because the apertures 34 are formed inside the configuration of the mating component, i.e. within the first outer periphery, a gasket 20 formed according to the present invention uses less material, thereby reducing cost. The resilient tab legs 38 deform independently when inserted into the corresponding apertures 34 such that insertion of the legs 38 into corresponding apertures 34 positively locates the gasket 20 in place against the mating flange 22. The combination of the tab legs 38, the slot 40 and the protrusions tabs 32, when placed into frictional engagement with the inner surface 36 of the apertures 34, effectively retains the gasket 20 in place against the first mating flange 22. Thus, the configuration of the resilient legs 38 produces a tight interference fit within the apertures 34. The gasket 20 is therefore held tightly in place by the tab legs 38. Because the tab legs 38 are also positioned vertical to the width of the gasket, the tab legs 38 may deform to allow for adjustment of the gasket relative to the mating flange, thereby accounting for linear tolerances of the apertures and for overall gasket tolerances. And finally, because the tabs 32 are formed as part of a metal layer of the gasket 20, both manufacture and assembly are simplified because no separate clips are required to attach the gasket 20 to the first mating flange 22.

Figure 4:
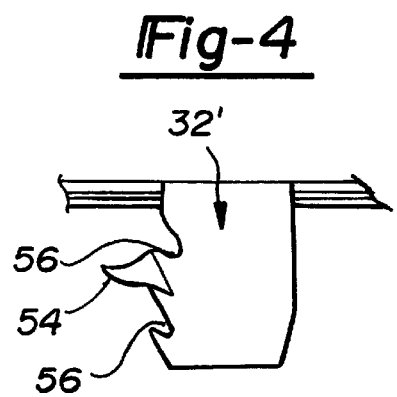
FIG. 4 is a side view of a second embodiment of a tab retainer.

A second preferred embodiment of a tab 32' is illustrated in FIG. 4. Tab 32' comprises a serrated side edge 52 terminating at a plurality of resilient points 54. Each point 54 extends upwardly and is angled with respect to an adjacent valley 56 such that tab 32 may be easily inserted into mating aperture 34 as the points 54 bend inwardly. However, each point 54 digs into the inner periphery 36 of the mating aperture 34 upon attempted removal of tab 32'.

Figure 5:
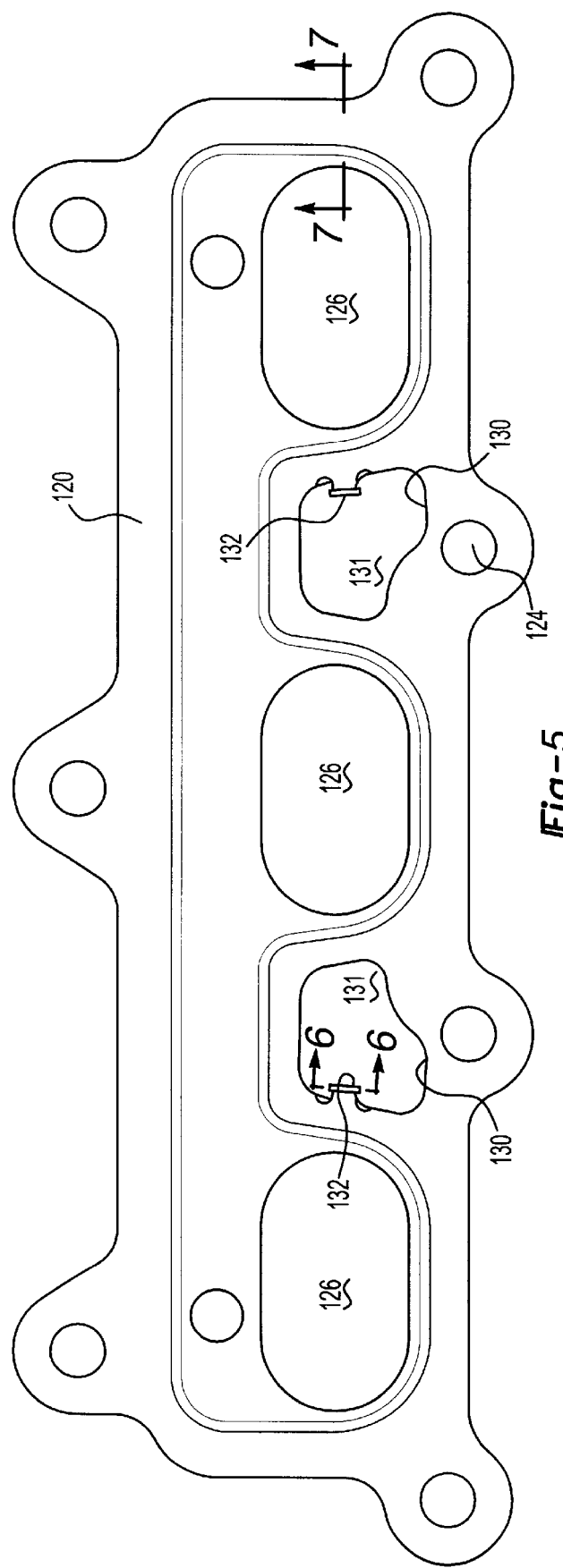
FIG. 5 is a bottom view of a third embodiment of a gasket according to the present invention.
Figure 6:
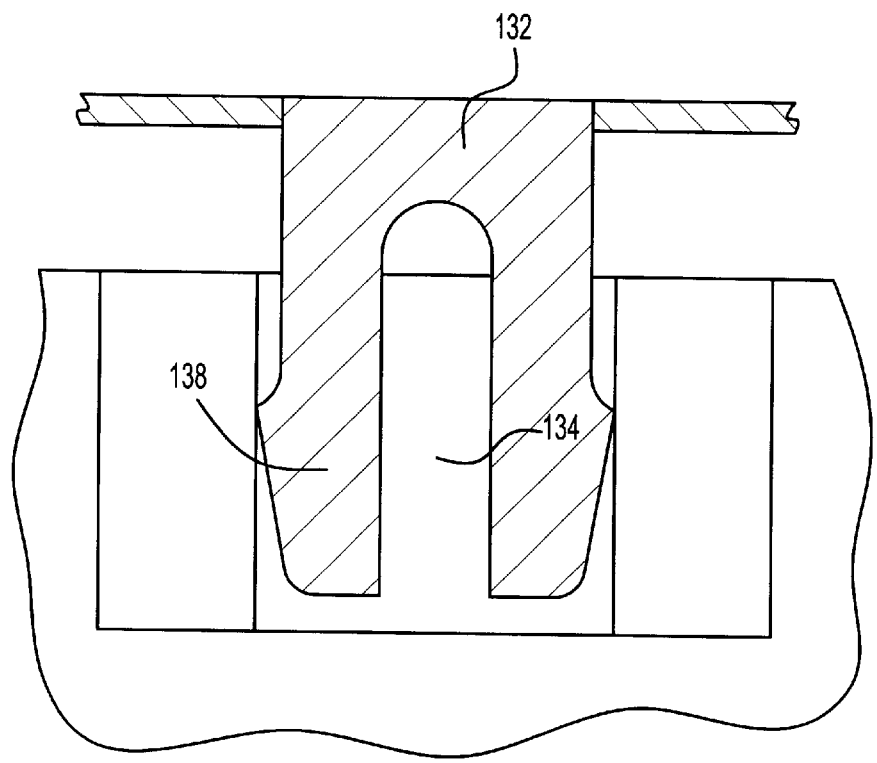
FIG. 6 is a side view of a tab retainer as it is inserted into an aperture according to lines 6—6 of FIG. 5.
Figure 7:
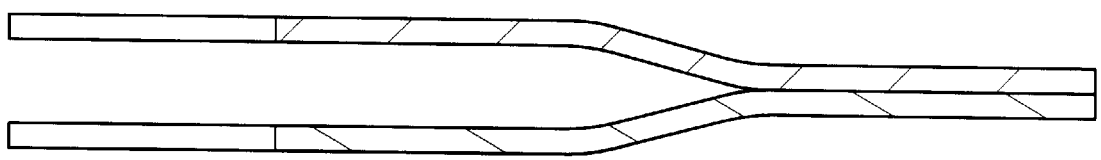
FIG. 7 is a side view of the gasket according to lines 7—7 of FIG. 5.

A third alternative embodiment of the invention is disclosed in FIGS. 5, 6 and 7, showing a two-layer exhaust manifold gasket 120. While a two-layer design is illustrated, a three or more layer design is also within the scope of the invention. Gasket 120 includes a plurality of bolt holes 124 and gas flow holes 126 that correspond to similar holes in a mating component. Like the first two embodiments, the layers of gasket 120 may further include embossments, folds or other sealing features. Because seals on the gasket must withstand high temperature and resist chemical attack, gasket 120 is preferably formed of a metal, and more preferably stainless steel. When formed from stainless steel, however, modifications to the production tooling may be required in view of the material characteristics.

According to the third embodiment, at least one metal layer of the gasket 120 includes at least two integral tabs 132. Each tab 132 is formed as a continuation of the metal layer along an inner periphery 130 of a mounting aperture 131. Permitting the tab to be formed as a continuation of a metal layer allows the shape of the tab to be formed in the same manufacturing operation. For example, mounting apertures 131, tabs 132, bolt holes 124 and gas flow holes 126 may be formed in the same stamping operation. As with the embodiments discussed above, tabs 132 are bent generally perpendicular relative to gasket 120 so that tabs 132 are positioned generally vertical to the width of gasket 120. Additionally, tabs 132 are spaced apart to prevent rotation of gasket 120 once it is installed. The geometric shape of tabs 132 is preferably substantially similar to tabs 32 in the first embodiment or, alternatively, may be formed substantially similar to tabs 32' in the second embodiment. However, it is within the scope of this embodiment that tabs 132 may be formed into any geometric shape that is convenient to manufacture and that achieves a tight interference fit within a mating aperture 134. The assembly of gasket 120 on a mating flange is substantially similar to the first embodiment as described above. Moreover, as with the earlier embodiments, tab legs 138 may deform to allow for adjustment of the gasket relative to the mating flange.

Accordingly, the present invention provides a gasket design that incorporates integral tabs formed as a continuation of a gasket layer to locate and retain the gasket on an engine component. The use of integral tabs eliminates the need to use clips to attach the gasket to the gasket-attaching portion of the component. While the use of integral tabs has been described in relation to an exhaust gasket, it is recognized that the present invention may be incorporated into other engine gaskets, such as a head gasket, to retain the gasket in place prior to assembly of the mating component.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. An exhaust manifold gasket for sealing between an exhaust header and a mating flange, said gasket comprising:
   at least two metal layers having a length and a width defining at least two mounting apertures, said length greater than said width, said layers constituting at least a part of the gasket and including at least one hole formed therein corresponding to a hole in the mating flange; and
   at least two integral tabs formed on at least one of said layers, each of said tabs formed as a continuation of said layer on an inner periphery of each of said mounting apertures, said tabs bent generally perpendicular to said layer, each of said tabs received in an aperture formed on the mating flange.

2. An exhaust manifold gasket as recited in claim 1, wherein said tabs are positioned generally vertical to said width of the gasket.

3. An exhaust manifold gasket as recited in claim 1, wherein said tabs are formed from two contoured tab legs that are separated to form a slot therebetween.

4. An exhaust manifold gasket as recited in claim 3, wherein each tab leg further includes a contoured tip located at a distal end thereof.

5. An exhaust manifold gasket as recited in claim 4, wherein said contoured tip of each said tab leg includes a laterally outwardly sloped portion along an outside edge of said tab leg.

6. An exhaust manifold gasket as recited in claim 5, wherein each said sloped portion terminates in a contoured, laterally outwardly extending protrusion.

7. An exhaust manifold gasket as recited in claim 1, wherein an outermost periphery of said tabs in an uncompressed state is greater in dimension than a corresponding inner periphery of said apertures such that an interference fit is created by said tabs and said apertures.

8. An exhaust manifold gasket as recited in claim 7, wherein said outermost periphery of said tabs includes a serrated edge, said edge oriented to promote tab insertion, but digging into said inner periphery upon attempted tab removal.

9. An exhaust manifold gasket as recited in claim 1, wherein the metal layers are stainless steel.

10. A sealing assembly, comprising:
- a flange to be sealingly engaged against a mating surface, said flange and said mating surface including at least one first hole formed therein to be sealed, said flange further defining at least two apertures formed on said flange;
- a metal layer constituting at least part of a gasket, said metal layer having a length and a width such that said length is greater than said width and defining at least two mounting apertures, said layer including at least one second hole corresponding to said first hole; and
- at least two integral tabs, each of said tabs formed as a continuation of said layer on an inner periphery of each of said mounting apertures, said tabs bent generally perpendicularly to said layer and received in said apertures.

11. A sealing assembly as recited in claim 10, wherein an outermost periphery of said tabs in an uncompressed state is greater in dimension than a corresponding inner periphery of said apertures such that an interference fit is created by said tabs and said apertures.

12. A sealing assembly as recited in claim 11, wherein said outermost periphery of said tabs includes a serrated edge, said edge oriented to promote tab insertion, but digging into said inner periphery of said apertures upon attempted tab removal.

13. A sealing assembly as recited in claim 10, wherein each of said tabs is formed from two contoured tab legs that are separated to form a slot therebetween.

14. A sealing assembly as recited in claim 13, wherein each tab leg further includes a contoured tip located at a distal end of each tab leg.

15. A sealing assembly as recited in claim 14, wherein said contoured tip of each said tab leg includes an outwardly sloped portion.

16. A sealing assembly as recited in claim 15, wherein each of said sloped portions terminates in a contoured, outwardly extending protrusion.

17. A sealing assembly as recited in claim 10, wherein the metal layers are stainless steel.

* * * * *